(12) United States Patent
Antill

(10) Patent No.: US 8,856,953 B2
(45) Date of Patent: Oct. 7, 2014

(54) ACCESS POLICY FOR PACKAGE UPDATE PROCESSES

(75) Inventor: James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 1022 days.

(21) Appl. No.: 12/873,850

(22) Filed: Sep. 1, 2010

(65) Prior Publication Data

US 2012/0054875 A1    Mar. 1, 2012

(51) Int. Cl.
  *G06F 17/30*    (2006.01)
  *G06F 21/10*    (2013.01)
  *G06F 9/445*    (2006.01)

(52) U.S. Cl.
  CPC . *G06F 8/65* (2013.01); *G06F 21/10* (2013.01)
  USPC .................. 726/28; 726/26; 726/27; 726/29; 726/30; 717/168; 717/173; 717/174

(58) Field of Classification Search
  USPC ................. 726/26–30; 717/168, 173, 174
  See application file for complete search history.

(56) References Cited

U.S. PATENT DOCUMENTS

| | | | |
|---|---|---|---|
| 6,438,749 B1 | 8/2002 | Chamberlain | |
| 7,181,603 B2* | 2/2007 | Rothrock et al. | 713/1 |
| 7,240,336 B1 | 7/2007 | Baker | |
| 7,512,939 B2 | 3/2009 | Brookner | |
| 7,624,393 B2 | 11/2009 | Egan et al. | |
| 7,657,885 B2 | 2/2010 | Anderson | |
| 7,836,341 B1 | 11/2010 | Krishnan | |
| 8,230,484 B1* | 7/2012 | Wiese | 726/3 |
| 8,239,674 B2* | 8/2012 | Lee et al. | 713/165 |
| 8,499,349 B1* | 7/2013 | Cruz et al. | 726/24 |
| 8,549,644 B2* | 10/2013 | Sallam | 726/23 |
| 8,595,844 B2* | 11/2013 | Bahl | 726/25 |
| 2003/0051235 A1 | 3/2003 | Simpson | |
| 2003/0229890 A1 | 12/2003 | Lau et al. | |
| 2004/0194081 A1* | 9/2004 | Qumei et al. | 717/173 |
| 2005/0210459 A1* | 9/2005 | Henderson et al. | 717/168 |
| 2006/0005254 A1* | 1/2006 | Ross | 726/27 |
| 2006/0190773 A1 | 8/2006 | Rao et al. | |
| 2006/0230398 A1 | 10/2006 | Yokota | |
| 2007/0004506 A1* | 1/2007 | Kinsley et al. | 463/29 |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2008/0134165 A1 | 6/2008 | Anderson et al. | |

(Continued)

OTHER PUBLICATIONS

Seth Kelby Vidal, "Systems and Methods for Restoring Machine State History Related to Detected Faults in Package Update Process", U.S. Appl. No. 12/788,036 filed May 26, 2010.

*Primary Examiner* — Thu Ha Nguyen
(74) *Attorney, Agent, or Firm* — Lowenstein Sandler LLP

(57) ABSTRACT

Methods and systems for defining and generating fine-grained access policy for authorizing software package updates are provided. The methods of defining and enforcing a package update policy include providing a package update policy file that identifies a set of software packages and users authorized to perform package updates in association with the set of software packages, and storing the policy file on computers in a managed network. When a computer in the managed network receives a request from an unprivileged user to update a software package on the computer, the computer retrieves the package update policy file and determines an authorization of the user to update the software package based on an identity of the user, an identity of the software package, and the policy file. The computer then processes the request based on the determined authorization of the user.

20 Claims, 4 Drawing Sheets

(56) References Cited

U.S. PATENT DOCUMENTS

| | | |
|---|---|---|
| 2008/0141240 A1* | 6/2008 | Uthe .......................... 717/174 |
| 2008/0201705 A1 | 8/2008 | Wookey |
| 2009/0013319 A1 | 1/2009 | Williams et al. |
| 2009/0037897 A1 | 2/2009 | Dull et al. |
| 2009/0222907 A1* | 9/2009 | Guichard ........................ 726/17 |
| 2009/0300595 A1 | 12/2009 | Moran et al. |
| 2010/0023933 A1 | 1/2010 | Bryant et al. |
| 2010/0058308 A1 | 3/2010 | Demshur et al. |
| 2010/0058314 A1 | 3/2010 | Wang |
| 2010/0083243 A1 | 4/2010 | Mincarelli et al. |
| 2012/0036552 A1* | 2/2012 | Dare et al. ........................ 726/1 |

* cited by examiner

ACCESS POLICY FOR PACKAGE UPDATE PROCESSES

FIELD

The present teachings relate generally to systems and methods for defining access policy, and more particularly to platforms and techniques for defining and enforcing a per-package or other fine-grained access policy for software package update processes.

BACKGROUND

In modern operating systems, ordinary unprivileged users are often distinguished from a more-powerful privileged user, sometimes referred to as a super user or "root" in UNIX or UNIX-like operating systems. While a privileged user typically has complete access to all aspects of an operating system ("OS") and hardware supporting the OS, unprivileged users typically have only limited access to services provided by the OS and have little direct control over the supporting hardware. Thus, an unprivileged user requires additional privileges and rights to perform certain privileged operations, such as installing software packages and updating installed software packages.

Various OS-specific access control mechanisms for granting unprivileged users the permission to perform privileged operations have been devised. For example, systems based on RED HAT LINUX™ distributions usually grant a user access to devices if, and only if, the user is logged in at a local console. In contrast, systems based on DEBIAN LINUX™ distributions often rely on group membership, e.g., users in the "optdrv" group can access optical drives, users in the "rmvdev" group can mount removable media, etc. Furthermore, commands such as "sudo" allow users to perform certain privileged operations with root privileges but without requiring a root password. Finally, software tools such as udev and GNU Network Object Model Environment ("GNOME") System Tools utilize inter-process communication mechanisms to provide a very narrow and well-defined subset of privileged operations to unprivileged desktop applications.

However, such OS-specific access control mechanisms can impede upstream projects (e.g., GNOME and KDE) from implementing features that require administrative privileges because most downstream consumers (e.g., OSes) implement different and often incompatible access control mechanisms. In addition, existing access control mechanisms are coarsely grained. For example, permission to perform privileged operations may be granted based on whether or not a user is at a console or is a member of a group. To compound the problem, granting permission based solely on group membership can be problematic because in certain OSes, if a user was once a member of a group, that user can become a member of the group again without proper authorization. Furthermore, improper usage of existing access control mechanisms such as sudo can cause full-fledged applications to run as a super user, which can result in millions of lines of code running as root. Not only does such misuse cause those applications to appear out of place because settings in those applications would read per-user settings from root's home directory, it also violates the principle of least privilege and circumvents critical security measures.

Therefore, it may be desirable to provide a mechanism for defining and enforcing a fine-grained access policy for performing privileged operations, such as installing and updating software packages, for instance on a per-package or other basis.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
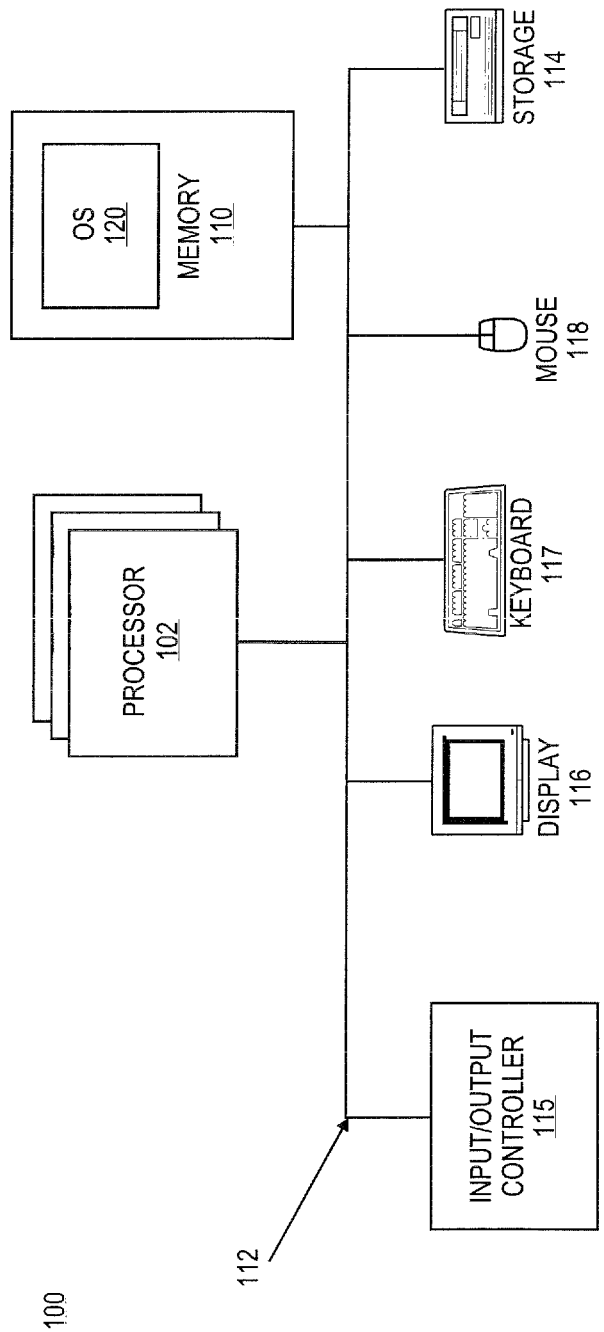
FIG. 1 illustrates a computer system that is consistent with embodiments of the present teachings.

According to the present teachings in one or more aspects, methods and systems that define and enforce a fine-grained access policy for performing software package-related privileged operations are provided. In a general implementation of the present teachings, an authentication agent is provided in an application space of an operating system ("OS"). The authentication agent can be operatively coupled to an access control mechanism provided in a kernel space of the OS, to allow unprivileged users to perform package-related privileged operations in accordance with fine-grained access policy and restrictions. In various embodiments, an unprivileged user can be a non-root user. Package-related privileged operations can include, for example, updating one or more packages, for instance updating an existing installed package, downloading a package, installing a new package, reinstalling an installed package, removing an installed package, downgrading an installed package, obsoleting an installed package, and/or other operations performed on, or related to, software packages and their related operating system and/or other resources.

The policy state of machines in a managed network with respect to package updates can be set by an administrator or left at default values, allowing unprivileged users on a client machine to access and download updates from a trusted repository (e.g., a FEDORA™ repository) and to perform package update on the client machine. To manipulate one or more users' privilege to download and/or update one or more packages on a client machine on a live basis, the administrator can create and/or edit a local access policy file or database on the client machine. The administrator can provide the local access policy file to permit selected users and/or users in selected groups or roles to perform package-related privileged operations on a package or a selected set of packages on the client machine. The local access policy file can be configured to apply to individually named users, groups of users, user roles, packages, applications, and/or other comparatively fine-grained entities and/or attributes, and/or to any combination thereof. The local access policy file can be configured to apply to individually named packages, groups of packages, classes or types of packages, or any combination thereof.

Reference will now be made in detail to exemplary embodiments of the present teachings, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which may be practiced. These embodiments are described in sufficient detail to enable those skilled in the art to practice these embodiments and it is to be understood that other embodiments may be utilized and that changes may be made without departing from the scope of the present teachings. The following description is, therefore, merely exemplary.

FIG. 1 illustrates a computer system 100 that is consistent with embodiments of the present teachings. In general, embodiments of the present teachings may be implemented in various computer systems, such as a personal computer, a server, a workstation, an embedded system, or a combination thereof. However, for purposes of explanation, system 100 is shown as a general purpose computer that is well known to those skilled in the art. Examples of the components that may be included in system 100 will now be described.

As shown, system 100 can include at least one processor 102, a keyboard 117, a pointing device 118 (e.g., a mouse, a touchpad, and the like), a display 116, main memory 110, an input/output controller 115, and a storage device 114. System 100 can also be provided with additional input/output devices, such as a printer (not shown). The various components of system 100 communicate through a system bus 112 or similar architecture. In addition, system 100 can include an operating system (OS) 120 that resides in memory 110 during operation. As to keyboard 117, pointing device 118, and display 116, these components can be implemented using components that are well known to those skilled in the art. One skilled in the art will also recognize that other components and peripherals can be included in system 100.

One skilled in the art will recognize that system 100 can include multiple processors 102. For example, system 100 can include multiple copies of the same processor. Alternatively, system 100 can include a heterogeneous mix of various types of processors. For example, system 100 can use one processor as a primary processor and other processors as co-processors. For another example, system 100 can include one or more multi-core processors and one or more single core processors. Thus, system 100 can include any number of execution cores across a set of processors (e.g., processor 102).

Main memory 110 serves as a primary storage area of system 100 and holds data that is actively used by applications running on processor 102. One skilled in the art will recognize that applications are software programs that each contains a set of computer instructions for instructing system 100 to perform a set of specific tasks, and that the term "applications" may be used interchangeably with application software, application programs, and/or programs in accordance with embodiments of the present teachings. Memory 110 can be implemented as a random access memory or other form of memory, which are well known to those skilled in the art.

OS 120 is an integrated collection of routines and instructions that are responsible for the direct control and management of hardware in system 100 and system operations. Additionally, OS 120 provides a foundation upon which to run application software. OS 120 may be predominantly software, but may also contain partial or complete hardware implementations and firmware. Well known examples of operating systems that are consistent with the principles of the present teachings include LINUX™, MAC OS™ by APPLE COMPUTER, SOLARIS™ by SUN MICROSYSTEMS, WINDOWS™ (e.g., WINDOWS CE™, WINDOWS NT™, WINDOWS 2000™, WINDOWS XP™, and WINDOWS VISTA™) by MICROSOFT CORPORATION, OPEN VMS™, and AIX™ by IBM.

Figure 2:
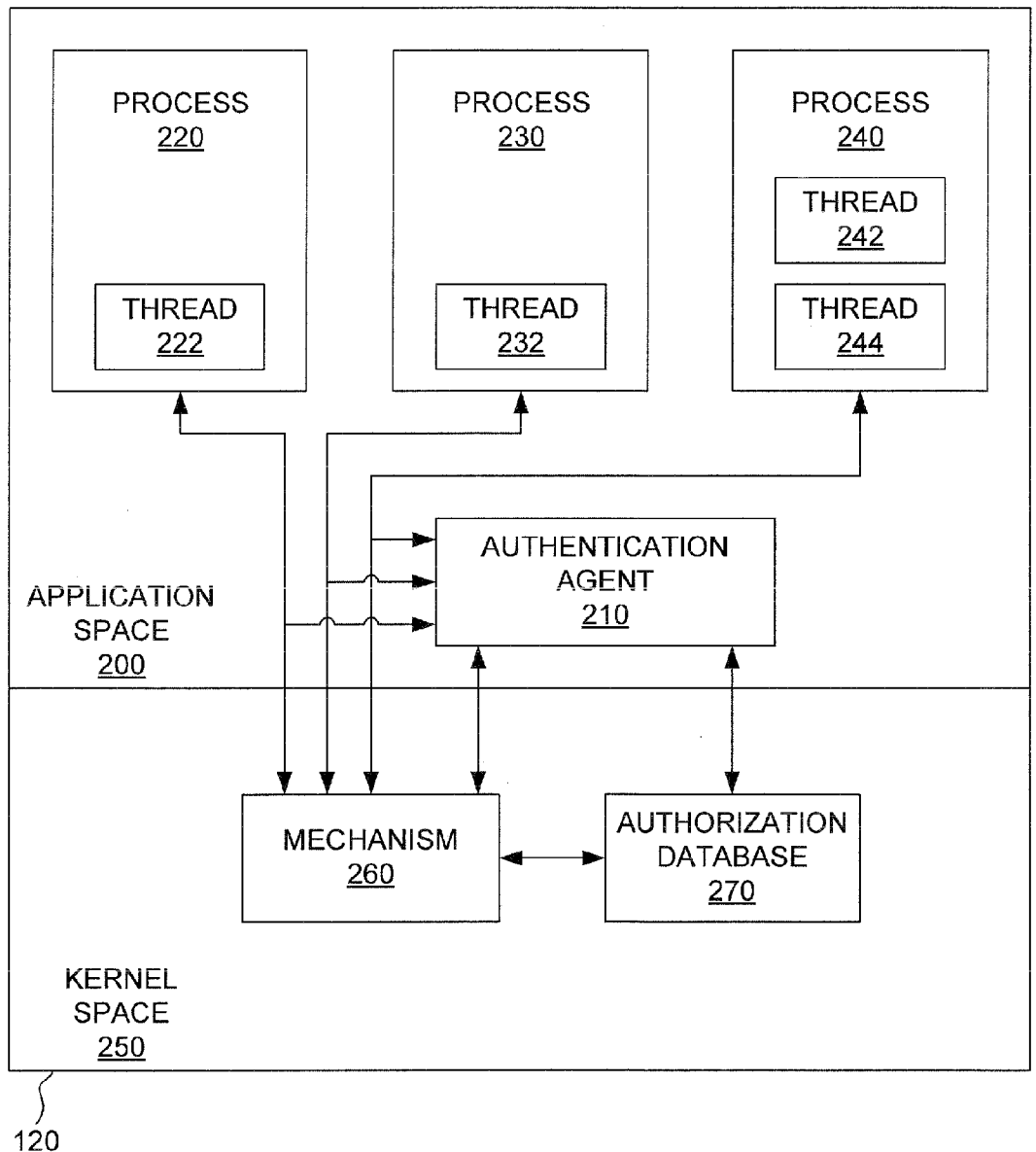
FIG. 2 illustrates an exemplary architecture for a mechanism that defines and enforces a fine-grained access policy for authorizing users to perform privileged operations, in accordance with various embodiments of the present teachings.

Reference will now be made to FIG. 2 to illustrate an exemplary embodiment of a mechanism for defining and enforcing a fine-grained access policy for performing software package-related privileged operations in system 100 in accordance with various embodiments of the present teachings. OS 120 can include a kernel (not shown), which serves as the core of OS 120 and can provide low-level services, such as thread management, address space management, direct memory access, inter-process communication, basic runtime libraries, defining and enforcing policies, access control, and the like. The kernel can directly access or reside in a kernel space 250 of memory 110 (as shown in FIG. 1) reserved for the use of the kernel, device drivers supported by the kernel, and any kernel extensions. In various embodiments, the kernel can initiate an authentication agent 210 and/or a mechanism 260 using one of the low-level services (e.g., an access control service) or basic runtime libraries (e.g., a runtime library for controlling access to privileged operations), either during startup (e.g., boot-up) of system 100 or on demand, such as when an unprivileged process in an application space 200 attempts to perform a privileged operation. A process can be considered unprivileged if its owner is an unprivileged user. For illustration purposes and without limiting various embodiments of the present teachings, authentication agent 210 is shown as dedicated process running separately from other processes in application space 200. Other configurations are possible without departing from the scope of the present teachings. For example, authentication agent 210 can run as a part (e.g., a thread) of a process (e.g., a process for package managment) or be co-instantiated with one or more other processes (e.g., a privileged helper process) by an application or the kernel.

In order to run applications in application space 200, OS 120 can create one or more processes (e.g., processes 220, 230, and 240) in application space 200 to execute the instructions of the applications. Processes 220, 230, and 240 can be instances of one or more applications, such as a networking applet, a file manager, a power manager, a package manager, or any other applications known to one skilled in the art. In various embodiments, application space 200 is operatively coupled to OS 120 and external to kernel space 250, and can have a lower level of privilege to access resources of system 100 than the kernel of OS 120. Application space 200 can be a user space provided by OS 120 and/or a runtime environment such as, for example, JAVA™ RUNTIME ENVIRONMENT by SUN MICROSYSTEMS and COMMON LANGUAGE RUNTIME by MICROSOFT CORPORATION.

Application space 200 can provide a set of software instructions that supports the execution of applications, and can include one or more application programming interfaces (not shown), or APIs. The APIs can be configured to provide a set of routines that the processes invoke to obtain authorization to perform package-related privileged operations such as a package update process, which can include updating, downloading, installing, reinstalling, removing, downgrading, and/or obsoleting a package. For example, the processes running in application space 200 can invoke an authorization API, which in turn rely on authentication agent 210 to determine and/or obtain authorization to perform one or more software package-related privileged operations.

The processes represent running instances of applications and includes variables and other state information. In general, the processes running in application space 200 are independent of each other, have separate address spaces, and can communicate with each other using known inter-process communication ("IPC") mechanisms (e.g., pipes, sockets, streams, Desktop Bus, and the like) or other communication services provided by OS 120. Each of the processes may include one or more execution contexts (e.g., threads 222, 232, 242, and 244). An execution context relates to the operations for performing one or more tasks of its associated process. Execution contexts are also known to those skilled in the art as threads of execution, fibers, and the like. Typically, multiple threads of a single process share the same address space and other resources of system 100. During runtime, the processes can each create one or more execution contexts to perform one or more tasks.

As shown in FIG. 2, authentication agent 210 runs in application space 200 and can communicate with mechanism 260 and/or an authorization database 270 via a system message bus (not shown). The system message bus can utilize IPC mechanisms or other communication mechanisms known to one skilled in the art. For illustration purposes and without limiting various embodiments of the present teachings, authorization database 270 is shown as separate from mechanism 260. Other configurations are possible without departing from the scope of the present teachings. For example, authorization database 270 can be a part of mechanism 260.

Authentication agent 210 can receive a request from one of the processes in application space 200 to perform one or more package-related privileged operations. After receiving the request, authentication agent 210 can identify the requesting process, the owner of the requesting process, the requested operation, and/or the object of the requested operation. Authentication agent 210 can determine if the requesting process and/or the owner thereof is authorized to perform the privileged operation in accordance with a fine-grained access policy. If authentication agent 210 determines that the requesting process and/or the owner thereof is authorized to perform the privileged operation, authentication agent 210 can write an entry for the requesting process in authorization database 270. Based on the entry in authorization database 270, mechanism 260 can authorize and/or perform the privileged operation requested by the requesting process.

Figure 3:
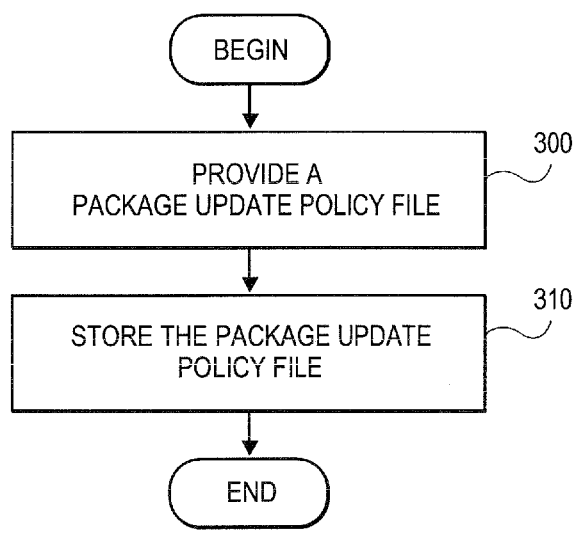
FIG. 3 illustrates an exemplary method for defining and providing a fine-grained access policy for authorizing users to perform software package-related privileged operations, in accordance with various embodiments of the present teachings.
Figure 4:
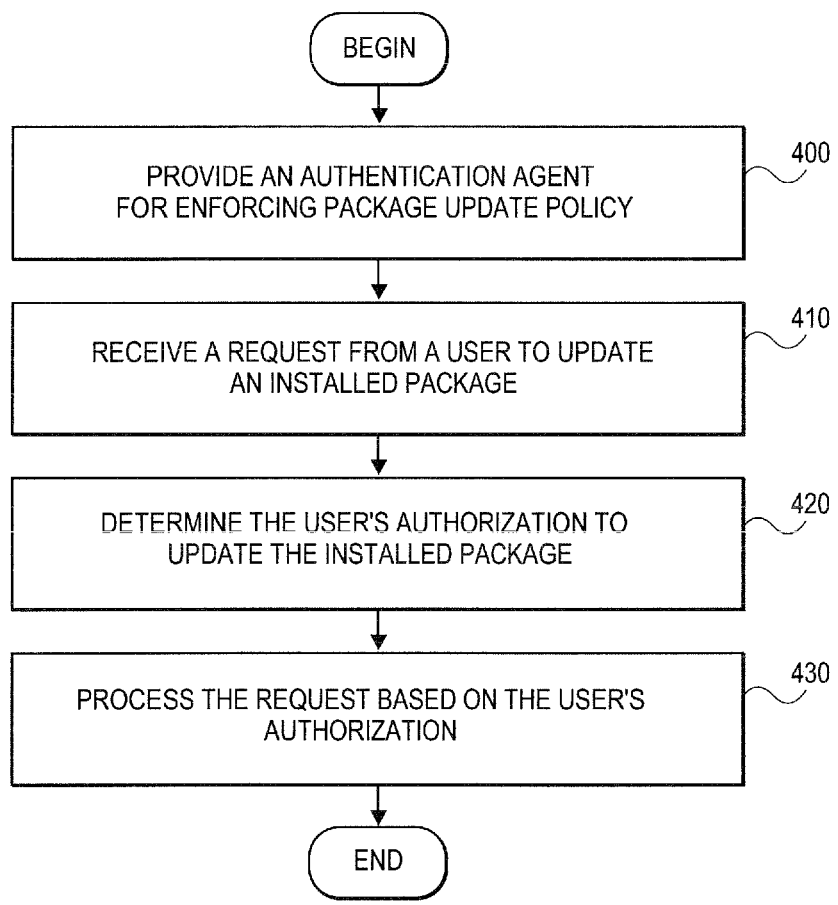
FIG. 4 illustrates an exemplary method for enforcing a fine-grained access policy for authorizing users to perform software package-related privileged operations, in accordance with various embodiments of the present teachings.

In various embodiments, the fine-grained access policy can define authorization levels required for one or more subjects to perform one or more actions on one or more objects. A subject can include a user, a group of users, a user role, and the like. The user can be, for example, the owner of a requesting process. An action can include a privileged operation, such as a software package-related privileged operation. An object can include a software package, a type of software package, a group identifier for a group of software packages, and the like. By using exemplary methods as illustrated in FIGS. 3 and 4 and described in greater detail below, authentication agent 210 and mechanism 260 can grant or deny requests by users to perform package-related privileged operations in accordance with a fine-grained access policy for package updates. The package update policy can define authorization levels required for one or more users to perform package-related privileged operations such as a package update process, which includes, for example, updating, downloading, installing, reinstalling, removing, downgrading, and/or obsoleting a package. The package update policy can identify one or more users using a user identifier ("UID"), a group identifier ("GID"), a user role, or any combination thereof. The package update policy can identify software packages using a package identifier, a type of package, a group identifier for a group of packages, or any combination thereof. Authorization levels can include, for example, authorized, authorized if authenticated as self, authorized if authenticated as an administrator, and unauthorized.

When a user makes a request via one of the processes in application space 200 to perform a package-related privileged operation, authentication agent 210 can grant or deny the request based on a subject, an action, and/or an object of the request. Authentication agent 210 can identify the requesting process and information associated with the requesting process, such as a process identifier ("PID"), a UID of the owner the requesting process, a GID of the owner, a session identifier and whether or not the session is active, and the like. Prior to granting the request, authentication agent 210 can require the owner of the requesting process to authenticate as the user identified by the UID or to escalate the user's access privilege by logging in as root or an administrator, in accordance with the fine-grained access policy.

FIG. 3 illustrates an exemplary method for defining a fine-grained access policy for authorizing unprivileged users to perform software package-related privileged operations, in accordance with various embodiments of the present teachings. In stage 300, an administrator in stage 300 can provide a package update policy file that identifies users authorized to perform package-related privileged operations on one or more computers in a managed network. The package update policy file can be configured to apply to individually named users, groups of users, user roles, or any combination thereof. The package update policy file can also be configured to apply to individually named packages, groups of packages, types of packages, or any combination thereof.

In stage 310, the administrator can store and/or edit the package update policy file on the computers in the managed network. Once the package update policy file is loaded on a computer (e.g., system 100), an access control mechanism (e.g., authentication agent 210, mechanism 260, and authorization database 270) can authorize selected users and/or users in selected groups or roles to perform package-related privileged operations on a package or a selected set of packages.

FIG. 4 illustrates an exemplary method for enforcing a fine-grained access policy for authorizing unprivileged users to perform software package-related privileged operations, in accordance with various embodiments of the present teachings. In stage 400, authentication agent 210 can be initiated in application space 200, either during startup of system 100 or on demand, such as when an unprivileged user attempts to perform a privileged operation. Authentication agent 210 can include a process, a daemon process, a non-kernel service, or the like.

In stage 410, authentication agent 210 can receive a request from an unprivileged user, e.g., via a process owned by the unprivileged user, to perform a package-related privileged operation. Authentication agent 210 can identify the requesting process and extract information associated with the requesting process, such as a UID of the owner of the requesting process, as well as the package or set of packages associated with the requested operation. Next, in stage 420, authentication agent 210 can determine, based on the fine-grained access policy, whether or not the unprivileged user is authorized to perform the privileged operation on the package or set of packages. Prior to authorizing the request, authentication agent 210 can require the owner of the requesting process to authenticate as the user identified by the UID or to escalate the user's access privilege by logging in as root or an administrator, in accordance with the fine-grained access policy.

In stage 430, if authentication agent 210 determines that the unprivileged user is authorized to perform the requested operation, then authentication agent 210 can, either directly or by using a privileged helper program, write an entry for the unprivileged user in authorization database 270 that authorizes the unprivileged user to perform the requested operation. Based on the entry in authorization database 270, mechanism 260 can authorize and/or perform the requested operation for the unprivileged user. Alternatively, if authentication agent 210 determines that the unprivileged user is not authorized to perform the requested operation, then authentication agent 210 can deny the request and can also take other actions, such as logging the request and/or notifying the administrator. After stage 430, processing can repeat, return to a prior processing stage, jump to a further processing stage, or end.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While various embodiments of the present teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. For example, although the exemplary method has been described by examples, the steps of the method may be performed in a different order than illustrated, or simultaneously. Moreover, while the exemplary systems and methods provide a mechanism for defining and enforcing a fine-grained access policy for performing software package-related privileged operations, the mechanism can be configured to define and enforce a fine-grained access policy for all or specific privileged operations, according to various embodiments of the present teachings. Those skilled in the art will recognize that these and other variations are possible within the spirit and scope as defined in the following claims and their equivalents.

What is claimed is:

1. A method, comprising:
   initiating, by a processor, an authorization agent in an application space of the processor;
   responsive to receiving a request from a user to update a software package, determining, by the processor executing the authorization agent, an authorization of the user to update the software package in view of a comparison of an identity of the user and an identity of the software package with a privilege policy stored in a policy file;
   in response to the user being authorized,
      writing, by the processor executing the authorization agent, in a record stored in a kernel space in which a kernel resides, an entry for updating the software package; and
      updating the software package in view of the entry; and
   in response to the user not being authorized, denying the request,
   wherein the application space is external to the kernel space.

2. The method of claim 1, wherein the policy file identifies the one or more software packages in view of at least one of a package identifier, a type of package, or a package group identifier of a group of packages.

3. The method of claim 1, wherein the policy file identifies the user in view of a user identifier, a group identifier, or a user role.

4. The method of claim 1, wherein the request from the user to update the software package on a computer comprises a request to update the software package, a request to download the software package, a request to install the software package, a request to reinstall the software package, a request to remove the software package, a request to downgrade the software package, or a request to obsolete the software package.

5. The method of claim 1, wherein processing the request further comprises preventing the user from updating the software package.

6. The method of claim 1, wherein processing the request further comprises authorizing the user to update the software package.

7. The method of claim 6, wherein determining an authorization of the user further comprises requiring an authentication of the user on a computer prior to authorizing the request.

8. The method of claim 6, wherein determining an authorization of the user further comprises requiring an escalation of an access privilege of the user on a computer prior to authorizing the request.

9. The method of claim 1, wherein determining an authorization of the user further comprises verifying that a package update for updating the software package is from a trusted source.

10. A method, comprising:
   providing a package update policy file that identifies a set of software packages and users authorized to update the set of software packages on one or more computers in a managed network; and
   storing the policy file on the one or more computers,
   wherein each of the one or more computers comprising a processor that performs operations comprising:
      initiating an authorization agent in an application space of the processor;
      receiving a request from a user to update a software package on the computer, wherein the user does not have root privileges on the computer;
      responsive to retrieving the policy file for the computer, determining, by the processor executing the authorization agent, an authorization of the user to update the software package in view of a comparison of an identity of the user and an identity of the software package with a privilege policy stored in the policy file;

in response to the user being authorized, writing, by the processor executing the authorization agent, in a record stored in a kernel space in which a kernel resides, an entry for updating the software package; and updating the software package in view of the entry; and in response to the user not being authorized, denying the request, wherein the application space is external to the kernel space.

11. The method of claim 10, wherein the policy file identifies the one or more software packages in view of a package identifier, a type of package, or a package group identifier of a group of packages.

12. The method of claim 10, wherein the policy file identifies the user in view of a user identifier, a group identifier, or a user role.

13. The method of claim 10, wherein the request from the user to update the software package on the computer comprises a request to update the software package, a request to download the software package, a request to install the software package, a request to reinstall the software package, a request to remove the software package, a request to downgrade the software package, or a request to obsolete the software package.

14. The method of claim 10, wherein determining an authorization of the user further comprises verifying that a package update for updating the software package is from a trusted source.

15. A computer system, comprising:

a processor;

an operating system comprising a kernel that resides in a kernel space;

an application space operatively coupled to the operating system, wherein the application space has a lower privilege level than the kernel; and an agent process, executed by the processor, running in the application space, wherein the agent process receive a request from a user to update a software package on the computer system, wherein the user does not have root privileges on the computer system;

retrieve a package update policy file for the computer system, wherein the policy file identifies one or more software packages and a set of one or more users authorized to update the one or more software packages on the computer system;

determine an authorization of the user to update the software package in view of an identity of the user, an identity of the software package, and the policy file;

write in a record stored in the kernel space, an entry for updating the software package; and process the request in view of the determined authorization of the user, wherein the kernel space is reserved for use by the kernel.

16. The system of claim 15, wherein the policy file identifies the one or more software packages in view of a package identifier, a type of package, or a package group identifier of a group of packages.

17. The system of claim 15, wherein the policy file identifies the set of one or more users in view of a user identifier, a group identifier, or a user role.

18. The system of claim 15, wherein the request from the user to update the software package on the computer comprises a request to update the software package, a request to download the software package, a request to install the software package, a request to reinstall the software package, a request to remove the software package, a request to downgrade the software package, or a request to obsolete the software package.

19. The system of claim 15, wherein the agent process further verifies that a package update for updating the software package is from a trusted source.

20. The system of claim 15, wherein the agent process further requires an escalation of an access privilege of the user on the computer system prior to authorizing the request.

* * * * *